United States Patent
Chtchetkine et al.

(10) Patent No.: US 6,356,915 B1
(45) Date of Patent: Mar. 12, 2002

(54) INSTALLABLE FILE SYSTEM HAVING VIRTUAL FILE SYSTEM DRIVE, VIRTUAL DEVICE DRIVER, AND VIRTUAL DISKS

(75) Inventors: Vladimir Chtchetkine, Irvine; Alan Kucheck, Santa Ana; Guennadi Terechtenko, Irvine, all of CA (US)

(73) Assignee: Starbase Corp., Santa Ana, CA (US)

( * ) Notice: Subject to any disclaimer, the term of this patent is extended or adjusted under 35 U.S.C. 154(b) by 0 days.

(21) Appl. No.: 09/255,831

(22) Filed: Feb. 22, 1999

(51) Int. Cl.$^7$ .............................................. G06F 17/30
(52) U.S. Cl. ........................................ 707/200; 707/10
(58) Field of Search ................... 707/200, 20

(56) References Cited

U.S. PATENT DOCUMENTS

| | | |
|---|---|---|
| 4,757,438 A | 7/1988 | Thatte et al. |
| 5,029,077 A | 7/1991 | Fatahalian et al. |
| 5,129,088 A | 7/1992 | Auslander et al. |
| 5,193,184 A | 3/1993 | Belsan et al. |
| 5,394,532 A | 2/1995 | Belsan |
| 5,404,477 A | 4/1995 | Jippo |
| 5,410,709 A | 4/1995 | Yu |
| 5,483,647 A | 1/1996 | Yu et al. |
| 5,574,862 A | 11/1996 | Marianetti, II |
| 5,606,681 A | 2/1997 | Smith et al. |
| 5,634,096 A | 5/1997 | Baylor et al. |
| 5,638,517 A | 6/1997 | Bartek et al. |
| 5,696,640 A | 12/1997 | Satoh |
| 5,752,005 A | 5/1998 | Jones |
| 5,809,285 A | 9/1998 | Hilland |
| 5,831,606 A | 11/1998 | Nakajima et al. |
| 5,832,299 A | 11/1998 | Wooten |
| 6,185,574 B1 * | 2/2001 | Howard et al. ............. 707/200 |

* cited by examiner

Primary Examiner—Paul R. Lintz
(74) Attorney, Agent, or Firm—Arter & Hadden LLP

(57) ABSTRACT

A data processing method and system for providing an installable file system using a basic file system driver and for flexibility in the views of objects through an operating system. An embodiment of the present invention includes a virtual file system which includes virtual files and folders correlated to native folders. Requests to open specified virtual files invoke the native file system driver to open the native files referenced by the virtual file for the specified virtual files. In addition, a view application is provided for configurable views of the files in the file system wherein the custom views include custom attributes relating to the file.

17 Claims, 11 Drawing Sheets

| Name | Size | Type | Modified |
|---|---|---|---|
| 📁 Clipart | | File Folder | 2/4/98 8:48 PM |
| 📁 Office | | File Folder | 2/4/98 8:44 PM |
| 📁 Queries | | File Folder | 2/4/98 8:47 PM |
| 📁 Templates | | File Folder | 2/4/98 8:45 PM |
| 🔑 Microsoft Access | 1KB | Shortcut | 5/1/98 1:15 PM |
| 🖌 Microsoft Binder | 1KB | Shortcut | 5/1/98 1:16 PM |
| ☾ Microsoft Bookshelf Basics | 1KB | Shortcut | 5/1/98 1:16 PM |
| ✕ Microsoft Excel | 1KB | Shortcut | 5/1/98 1:15 PM |
| 🖥 Microsoft Office Setup | 1KB | Shortcut | 5/1/98 1:15 PM |
| 🖥 Microsoft Power Point | 1KB | Shortcut | 5/1/98 1:16 PM |
| W Microsoft Word | 1KB | Shortcut | 5/1/98 1:15 PM |
| 👥 MS Access Workgroup Administrator | 1KB | Shortcut | 2/4/98 8:44 PM |
| 📄 Mscreate.dir | 0KB | DIR File | |
| 📄 Of97spec.ini | 1KB | Configuration | 11/17/96 12:00 AM |

*Fig. 8*
PRIOR ART

| Name | Status | Locked By | Revision On Disk | Size | Type | Modified | Attributes |
|---|---|---|---|---|---|---|---|
| hlp | In View | | | | File Folder | 2/17/99 3... | R |
| res | In View | | | | File Folder | 2/17/99 3... | R |
| test219 | In View | | | | File Folder | 2/17/99 3... | R |
| User Manual | In View | | | | File Folder | 2/17/98 4... | R |
| Ipframe.h | Missing | | | 2KB | H File | 2/17/98 4... | |
| Mainfrm.cpp | Missing | | | 4KB | CPP File | 12/30/98... | |
| Mainfrm.h | Missing | | | 2KB | H File | 2/17/98 4... | |
| Makehelp.bat | Missing | | | 2KB | MS-DOS Batch... | 1/12/99 1... | |
| Pendlg.cpp | Missing | | | 2KB | CPP File | 2/17/98 4... | |
| Pendlg.h | Missing | | | 2KB | H File | 2/17/98 4... | |

INSTALLABLE FILE SYSTEM HAVING VIRTUAL FILE SYSTEM DRIVE, VIRTUAL DEVICE DRIVER, AND VIRTUAL DISKS

NOTICE OF COPYRIGHTS AND TRADE DRESS

A portion of the disclosure of this patent document contains material, which is subject to copyright protection. This patent document may show and/or describe matter, which is or may become trade dress of the owner. The copyright and trade dress owner has no objection to the facsimile reproduction by any one of the patent disclosure, as it appears in the Patent and Trademark Office patent files or records, but otherwise reserves all copyright and trade dress rights whatsoever.

BACKGROUND OF THE INVENTION

1. Field of the Invention

The present invention relates generally to data processing systems and, more particularly, to object oriented data management. The present invention further relates to visual representation of data as files stored on logical drives.

2. Description of Related Art

A computer operating system represents a collection of computer programs or routines which control the execution of application programs and that may provide services such as resource allocation, scheduling, input/output control, and data management. Most operating systems store logical units of data in files, and files are typically grouped in logical units of folders. Folders are themselves files which identify the files assigned to them and a folder can store other folders. Folders are sometimes also referred to as directories. An interrelated collection of files is called a file system.

Most file systems have not only files, but also data about the files in the file system. This data typically includes time of creation, time of last access, time of last write, time of last change, file characteristics (e.g., read-only, system file, hidden file, archive file, control file), and allocation size.

Most operating systems are designed to shield applications from direct interaction with the hardware which actually store file systems. File systems typically are stored in mass storage devices. A mass storage is a device having a large storage capacity, and may be read-write (e.g., a hard disk drive) or read-only (e.g., a CD-ROM drive). Some mass storage devices, for example RAID systems, comprise a collection of mass storage devices. Mass storage devices also typically have the quality of non-volatility.

Most contemporary operating systems, and Windows NT/95/98 in particular, have layered models of drivers where each layer has a particular set of responsibilities. On the lowest level there are drivers that work directly with hardware (mass storage devices, network cards, buses, etc.). Higher level drivers communicate with lower level drivers in order to exchange information between the hardware the user. A driver for one type of mass storage device will differ from a driver for another type of mass storage device, and both of these drivers will differ from a driver used to interface the operating system to a printer.

Typical hard disk drives store data in minimum units of sectors. Sectors on a hard disk drive typically comprise an addressable subdivision of a track used to record one block of data on the hard disk drive. Hard disk device drivers typically provide services for reading sectors from a hard disk drive and writing sectors to the hard disk drive. The hard disk device driver typically relates to the data only on the sector-level, and cannot relate to the data on a file system level.

The storage space of a mass storage device is logically divided into one or more logical disks also known as partitions. Conversely, drivers are available which will treat a group of mass storage devices as a single logical disk. In Windows operating systems, each logical disk is served by a disk device driver which also holds a drive designation, C:, D:, E,. etc. Windows operating systems don't limit logical disks being part of a mass storage device. For example, a RAM disk uses part of the computer's operating memory as a storage of its sectors.

The task of interfacing applications to the contents of a logical disk is assigned to a file system driver. A file system driver is a collection of function routines and file management structures that perform various tasks related to files and folders stored in logical disks. The function routines of a file system driver are used to open specified files, read specific blocks of data, write specific blocks of data, and close files. A file system driver is a significant portion of an operating system. File system drivers uses the services of a disk device driver to read sectors, translate sector data and give the user lists of files stored on the hard disk drive.

The structure of data stored in a logical disk is file system-dependent. For example, the FAT file system requires a logical disk to have a boot sector that describes location of File Allocation Tables (FAT) sectors and root directory sectors within this disk. Other file systems, such as NTFS, HPFS, etc. operate with different data structures and are incompatible with the structures of other file systems.

The process of coupling a file system driver and a disk device driver is called "mounting of the file system on the disk device." When the operating system detects a new disk device in the system, the operating system sends a mount request to each file system driver that is currently registered with the operating system. The mount request includes a number of parameters, including a reference to the disk device driver that serves the new disk device. When a registered file system driver receives a mount request, the file system driver reads predefined sectors from the disk using services of the disk's device driver in order to check if data structures in the sector correspond to what is expected by this file system. If a file system driver recognizes the expected data structures, the file system driver returns a code to the operating system which indicates that the file system driver will serve all of the file requests for the new disk device. At this point the mount process is complete. A disk device with a mounted file system is also known as a volume.

As operating systems become more complex, file systems likewise become more complex. A file system for a computer network operating system may have hundreds of function routines. The vast majority of these function routines may provide seldom used, obscure functions not needed for basic file operations. Moreover, complex operating systems are often configured to optimize performance for specific types of devices. Typically, hard disk access performance is optimized because hard disks are capable of high data transfer rates and such access occurs nearly continuously in the operation of many computers and computer networks.

The organization of files within typical file systems of conventional operating systems is relatively inflexible. Conventional operating systems provide dividing a hard disk into several logical drives of varying size. Once the hard disk has been configured as one or more logical drives, alteration of the configuration is very difficult. Although the conventional operating systems permit changes to the logical drive configuration, this reconfiguration typically results in the destruction of the data in the reconfigured logical drives. Thus, before reconfiguring logical drives, the files stored on the logical drive must be backed up, and after reconfiguration, the files must be restored. This process of reconfiguring logical drives is very burdensome and exposes the files to damage. Furthermore, in most operating systems, only high level users, such as system administrators, have the security rights and skills to reconfigure logical drives. As a result, once a logical drive has been configured in a conventional operating system, it is rarely reconfigured.

Another characteristic of conventional operating systems, file system drivers and disk device drivers is that the contents of the logical drives cannot be customized. Conventional operating system such as Windows NT permit multiple users to have access to the files in a logical drive. However, the hierarchical representation of how the files are stored in the logical drive is identical for all users. Conventional operating systems include security means which may be used to limit access of certain users to certain files or parts of a logical drive. However, this does not alter the fact that there is only one hierarchical representation of how the files are stored in the logical drive.

Conventional operating systems are also limited in their visual representation of information about the files stored on logical drives. Conventional operating systems maintain only limited file information, such as date and time of creation and modification, user access rights, and size. However, beyond this basic file information attributes, the conventional operating systems do not store other attributes that the files may have obtained. For example, some types of data repository systems are known which store considerable amounts of information about files. This additional information includes version tracking and access tracking. The conventional operating systems do not store such additional information, and they also lack the ability to display the additional information. More particularly, the visual displays of files and file information through an operating system typically cannot be changed except through extensive alteration of the viewer.

One solution to these problems is to create and install a custom file system which replaces or otherwise augments the pre-existing or "native" file system. Such a custom file system could be designed to allow freer reconfiguration, and to allow storage and display of more file information. However, implementing the hundreds of function routines included in a file system is an exceptionally complex task. If successful, the resulting custom file system would be an undesirably large and complex program which would be difficult to successfully debug, and cost an excessive amount to create.

Another solution is to provide an enterprise document management system (EDMS). An EDMS includes a database and is installed on top of an existing file system. The database itself comprises one or more files, and the objects which users would otherwise view as files are actually stored as records in the database. The major limitation of EDM systems is that they are not compatible with applications which are also installed on the operating system. To provide this compatibility, the applications must be modified to access the EDM database instead of the logical drives. Yet, by doing so, access to the logical drives from the applications becomes inconvenient and sometimes impossible. Furthermore, the users must be trained on the EDM system and how to use each specially modified application. Installation of an EDMS entails transfer of existing files into the EDM database. Such modifications, training and installation can entail huge expenses and severe workflow disruptions.

Another solution is shown in U.S. Pat. No. 5,752,005. In that patent a computer includes an operating system having a system manager and a native file system. An installable file system installs hooks at a core interface between the system manager and the native file system. Hooks are installed for only a portion of the many native function routines provided by the native file system. A virtual driver communicates with the native file system and simulates a file storage device having substantially no files stored thereon. This system is designed to provide access to foreign devices having a foreign file system. Foreign file system device requests for function routines that have not been hooked are handled by the native file system and virtual device. Foreign file system device requests for hooked function routines are handled by a foreign file system. This system is considered inadequate to solve the above-identified problems because it continues to be limited to the conventional single hierarchical representation of how the files are stored in the relevant mass storage devices. Furthermore, this system requires full implementation of the major file system routines, while preserving cache coherency and consistency. These major file system routines—open, read, write, close, etc., are the most complex and expensive parts of a file system driver to develop.

SUMMARY OF THE INVENTION

The method comprises devices and methods for providing an installable file system using a basic file system driver, and for providing flexibility in the views of objects through an operating system.

In accordance with one aspect of the invention, there is a method of organizing files in an data processing system. The data processing system comprises an operating system, a native file system comprising native folders and native files, a first mass storage device having a native disk in which the native file system is stored, and a native file system driver for interfacing the operating system to the native file system. The method comprises first installing a virtual file system driver. Next, the virtual file system driver creates virtual disks having respective virtual file systems. The virtual file systems comprise virtual folders and virtual files. The virtual file systems include, for each virtual folder, a reference to a one of the native folders, and for each virtual file a reference to a one of the native files. The method further includes receiving requests to open specified virtual files, and invoking the native file system driver to open the native files referenced by virtual file system for the specified virtual files.

In accordance with one aspect of the invention, there is a data processing system comprising an operating system responsive to file access service requests of applications programs. The data processing system further comprises one or more mass storage devices, each mass storage device comprising one or more native disks. Each native disk stores a single native file system. The native file systems comprise native files, and the native file systems include names, attributes and locations of the respective native files stored in the native file system. The data processing system further comprises one or more native file system drivers, each native file system driver comprising function routines and file management structures for providing file access services to the operating system with respect to at least one of the native file systems. The native file system drivers each provide a single representation of the respective native file systems. The data processing system further comprises a virtual file system driver comprising function routines and file management structures for providing file access services to the operating system with respect to virtual files. At least one virtual file comprises a logical representation in a virtual file system of a one of the native files. The logical representations comprises a mapping of the one native file to the at least one virtual file. The virtual file system driver emulates the virtual file system to the operating system as an additional native file system. The virtual file system driver represents the structure of the virtual file systems in a user-defined manner without restriction as to the location of any particular native file in any particular native file system. The virtual file system driver, in response to a file access request for a one of the virtual files mapped from a native file, invokes the native file system driver which is associated with the native file system having the mapped native file, the invocation including a reference to the mapped native file.

In accordance with another aspect of the invention there is a method of representing data as files in a data processing system. The data processing system comprises an operating system having a default view component for providing default file attributes of files in a file system in a default view. The default view component of the operating system is accessible to applications programs. The data processing system further comprises one or more mass storage devices. Each mass storage device comprises one or more logical disks. Each logical disk stores a file system, the file systems comprising files, the file systems including names, attributes and locations of the respective files stored in the respective file systems. The data processing system further comprises one or more file system drivers. Each file system driver comprises function routines and file management structures for providing file access services to the operating system with respect to at least one of the file systems. The file system drivers each provide a single representation of the respective file systems. The data processing system also comprises a view application for providing configurable views of the files in the file systems. The configurable views include custom file attributes which are not available in the default views provided by the default view component of the operating system. The method comprises requesting by one of the applications programs a first view of a first defined part of one of the file systems. The method further comprises the default view component of the operating system providing a default view of the first defined part. The method further comprises requesting by one of the applications programs a second view of a second defined part of one of the file systems. The method further comprises substituting the view application for the default view component of the operating system with respect to the second defined part. The method further comprises the view application providing a non-default view of the second defined part.

In accordance with another aspect of the invention there is another method of representing data as files in a data processing system. The data processing system comprises a mass storage device. The mass storage device comprises a native disk storing a native file system. The native file system comprises plural native files. The native file system includes default file information for each file including a name, an attribute and a location of the file. The data processing system further comprises an operating system having a default view component for providing the default file information in a default view. The default view component of the operating system being accessible to applications programs. The data processing system further comprises a native file system driver. The native file system driver comprises function routines and file management structures for providing file access services to the operating system with respect to the native file system. The native file system driver provides a single representation of the native file systems. The method comprises installing a virtual file system driver in the data processing system. The virtual file system driver comprises function routines and file management structures. The method further comprises the virtual file system driver emulating a virtual file system to the operating system as an additional native file system. The virtual file system comprises virtual files, each virtual files representing an object. The method further comprises storing in the virtual file system user interface class identifier of the view application. The method further comprises a one of the applications programs requesting a view of a defined part of the virtual file system. The method further comprises substituting a view application for the default view component of the operating system with respect to the defined part of the virtual file system. The method further comprises loading the view application. The method further comprises the view application providing a custom view of the defined part of the virtual file system, the custom view including custom attributes relating to the objects.

Other aspects of the invention include devices, systems, programs and methods related to the matter described above.

DESCRIPTION OF THE DRAWINGS

Further objects of this invention, together with additional features contributing thereto and advantages accruing therefrom, will be apparent from the following description of a preferred embodiment of the present invention which is shown in the accompanying drawings with like reference numerals indicating corresponding parts throughout and which is to be read in conjunction with the following drawings, wherein:

FIG. 8 is a partial screen shot of a prior art default view of a file system using Windows Explorer.

FIG. 10 is another screen shot of a custom view of a virtual file system in accordance with the invention.

These and additional embodiments of the invention may now be better understood by turning to the following detailed description wherein an illustrated embodiment is described.

DETAILED DESCRIPTION OF THE INVENTION

Throughout this description, the preferred embodiment and examples shown should be considered as exemplars, rather than limitations on the apparatus and methods of the present invention.

Data Processing System Overview

Figure 1:
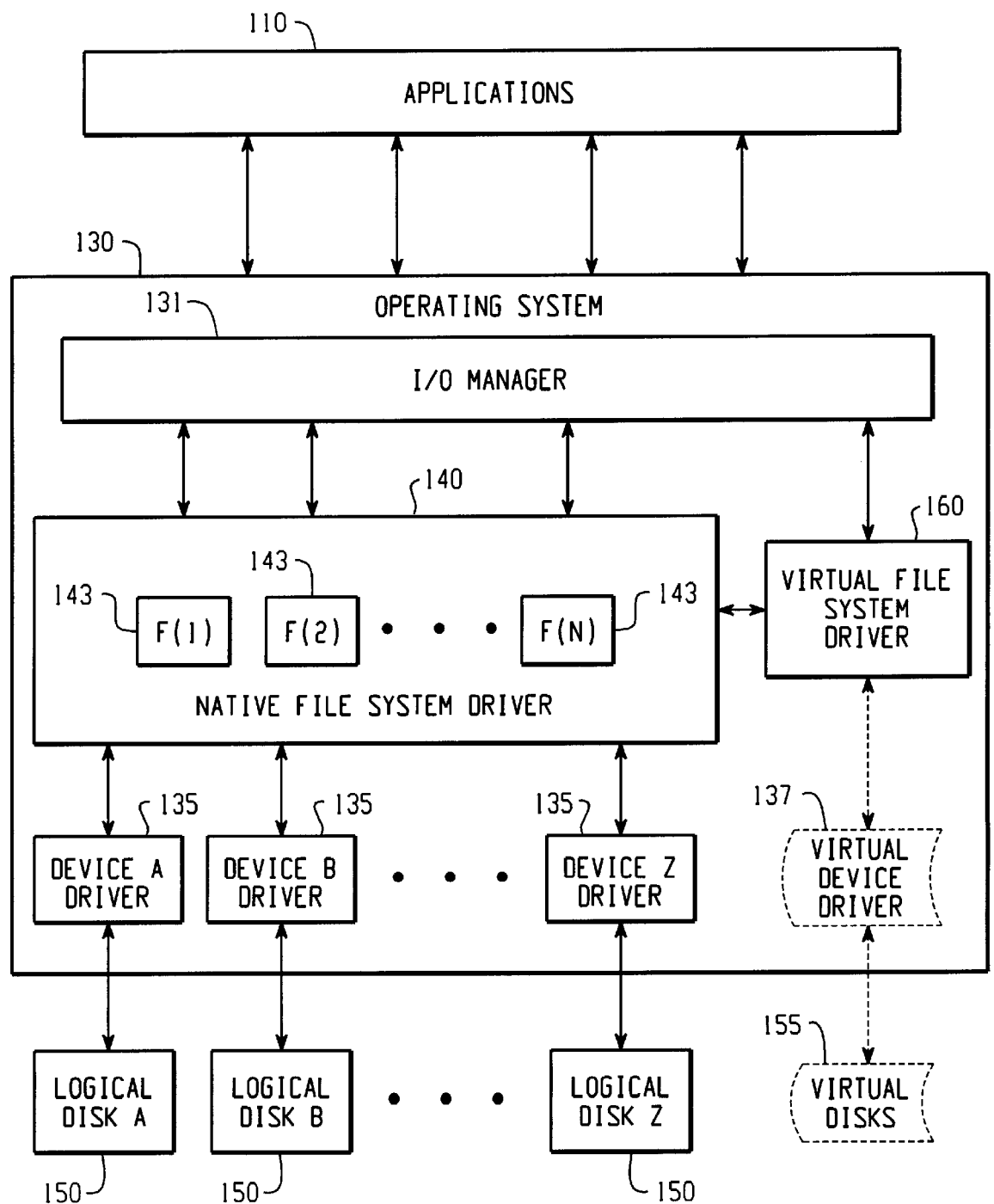
FIG. 1 is a block diagram of a collection of computer programs installed on a computer in accordance with the present invention.

FIG. 1 shows a block diagram of a collection of computer programs installed in a data processing system 100 such as a computer workstation. FIG. 1 illustrates computer programs arranged in a hierarchy with applications 110 at the top of FIG. 1 and mass storage devices having one or more volumes 150 located at the bottom. Applications 110 are high level computer programs which accomplish specific tasks. Often, these tasks are the uses which justify the existence of the data processing system, and applications 110 are desirably configured to be easily transportable from data processing system to data processing system. The data processing system may include other devices and their drivers, such as printers, network interfaces, etc.

For purposes of the present invention, the operating system 130 is described herein in a manner consistent with Windows NT operating system. However, those skilled in the art should appreciate that different operating systems, such as Windows 98, Novell NetWare and Unix, have similar features and functions and that the present invention is not limited to use only in connection with the Widows NT operating system. One salient feature of these operating systems is that they permit installation of drivers, particularly file system drivers. In the preferred embodiment, the operating system 130 provides for installable file systems.

The operating system 130 comprises an I/O manager 131, a native file system driver 140, and device drivers 135 as known in the art. In some operating systems, the I/O manager 131 comprises a system manager which manages RAM, coordinates multiple access at the same time, and performs numerous other functions. In accordance with the invention, the operating system further includes virtual file system driver 160.

As used herein, "native file system driver" is used to differentiate file system drivers from the virtual file system driver 160. It is within the scope of the invention for a "native file system driver" to be inherent to the operating system or to be installed into the operating system. Although the virtual file system driver of the invention will normally be installed after the native file system drivers, it is within the scope of the invention for native file system drivers to be installed after the virtual file system drivers are installed. A "native file system" is used herein to refer to a file system which is recognized by the operating system, but is not the virtual file system of the invention. A "native disk" as used herein refers to the object commonly referred to as a logical disk drive.

The data processing system includes a number of data flows. Data flows between I/O manager 131 and higher level programs, such as applications 110. Data flows between I/O manager 131 and the file system drivers 140, 160. Data flows between the native file system driver 140 and the mass storage device drivers 135 as known in the art. Data flows between the mass storage device drivers 135 and the native disks 150 as known in the art. In accordance with the invention, data flows between the virtual file system driver 160 and the native file system driver 140.

The native file system driver 140 includes a multiplicity of function routines 143. FIG. 1 identifies function routines 143 using the nomenclature of F(1), F(2), . . . F(N). In more complex operating systems, native file system driver 140 includes hundreds of function routines 143. Function routines 143 are called by higher level programs in response to requests for specific services to be performed with respect to a specific device. In a very general sense, the requested services relate to transferring data and to managing the transfer of data. Function routines 143, with the help of lower level software and the hardware devices, perform the requested services.

The virtual file system driver 160, along with other computer programs described below serves a role in simulating the existence of the virtual disks 155 in accordance with the principles of the present invention.

The virtual file system driver 160 is accessed from the I/O manager 131 in precisely the same manner as the native file system driver 140. An important benefit of the virtual file system driver 160 is that the virtual file system driver 160 permits any number of virtual volumes 155 to be created and manipulated. Each virtual disk 155 has its own virtual file system. Using the virtual file system driver 160, a user is able to map as virtual files on the virtual file system those native files from any native file system to which the user has access. This allows the user to create any number of file hierarchies, eliminating the need, for example to alter disk partitions.

As indicated above, folders are a species of file which identify the files assigned to them, including other folders. Because of this property, references to files herein, whether native or virtual, should be understood to also refer to folders. In specific situations in this discussion, functionality with respect to folders is addressed.

Components Which Enable Virtual File Systems

Figure 2:
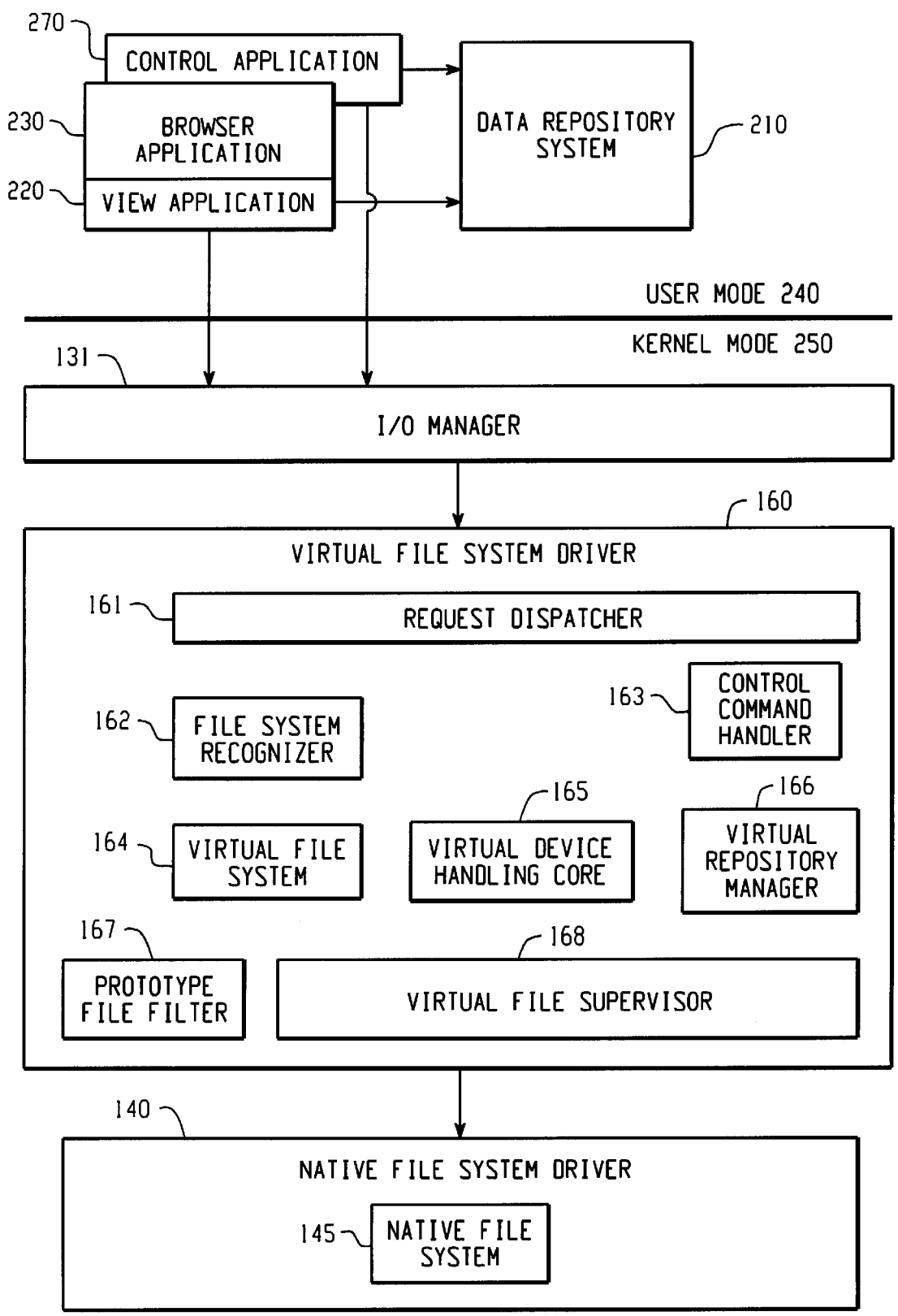
FIG. 2 is a block diagram of the system of the invention from an execution mode perspective.

FIG. 2 shows a block diagram of two execution modes, a user mode 240 and a kernel mode 250. These execution modes are defined in the Windows NT specifications, and are shown only as examples. Other operating systems may have different functional hierarchies but may be nonetheless compatible with the present invention.

The kernel mode 250 includes the I/O manager 131, virtual file system driver 160 and native file system driver 140 as described above with respect to FIG. 1. The native file system driver 140 is shown for exemplary purposes as having a native file system 145, though plural native file systems and plural native file system drivers are within the scope of the invention.

The user mode 240 includes a control application 270, a browser application 230, a view application 220. By "browser application," it is meant an application which allows a user to view file systems. For example, most user applications are browser applications because they permit users to view file systems as part of the file open process.

The user mode 240 further includes a data repository system 210. As used herein, a "data repository" is an aggregation of data which is kept and maintained in an organized way. As used herein, a "data repository system" comprises a data repository and special routines needed, if any, to access the data repository. A data repository system in accordance with the invention may be a version control system. Those skilled in the art will appreciate that the data repository system 210 may have a hierarchical structure. The data repository system 210 may provide one or more particular views of data in the data repository system 210, each of which may to certain parts of the data in the data repository system 210. In other words, the data repository includes containers and items, and it may have one or more views each of which covers a specified hierarchy of containers and items. A "container" is a collection of items within the data repository, and it is analogous to a folder. A container can contain other containers as well as items. An "item" is analogous to a common file and some items are, in fact, files. For example, a tip (or latest) file revision is a type of item which appears as a common file in the disclosed embodiment. Other types of revision items are preferably retrievable as files by "checking out" the specified file revision from the data repository system 210. Thus, an item should be considered as any item belonging to a data repository system that can be extracted from the data repository system and represented as a file.

In the preferred embodiment of the invention, the virtual file system driver 160 and the control application 270 provide integration of certain aspects of the data repository system 210 with the native file system 140. In particular, the control application 270 interfaces with the virtual file system driver 160 and the data repository system 210 to provide the virtual file system driver 160 with a list of items and containers in the data repository system 210 that should be represented as virtual files located on a virtual disk. The control application 270 also interfaces with the data repository system 210 to extract and store in the native disk 150 the items and containers which will serve as prototypes to virtual files.

In the preferred embodiment, the control application 270 communicates with the virtual file system driver 160 using privately defined I/O control commands transferred via the API of the Win32 subsystem. The control application 270 can optionally also access the data repository system 210 via available interfaces (i.e., APIs) of the data repository system 210.

One embodiment of the invention is StarDisk 4.0. The StarDisk User's Guide is included as an Appendix and is incorporated herein by reference.

The Control Application

The control application 270 has two primary functions. First, the control application 270 represents the contents of the data repository system 210, such as in the disclosed embodiment, a set of views that may be mapped to the virtual disks 155. Second, the control application 270 allows a user to create virtual disks 155 and to determine which items and containers from the data repository system 210 will be mapped to virtual file systems on the virtual disks 155. Preferably, users may interact with the control application 270 through user interface devices such as windows and dialogs in the manner known in the art.

After the user selects the repository items and containers to be mapped to his virtual file system, the control application 270 works with the virtual file system device driver 160 to create or modify the user's virtual disk 155. In particular, the control application 270 issues commands to define the virtual files to be represented on the virtual disk 155, and also to define the attributes of the virtual disk 155.

In accordance with the Windows NT operating system, the control application 270 preferably communicates with the virtual file system driver 160 by issuing control commands via DeviceIoControl API of Win32 subsystem. The virtual file system driver 160 communicates with the control application 270 by signaling an event object that is shared between the virtual file system driver 160 and the control application 270. When the control application 270 detects that the event object is in the signaled state, the control application 270 issues control commands to the virtual file system driver 160 and obtains the requested data. The issuance of control commands and the use of event objects are well known programming techniques for the Windows NT operating system. Event objects allow program threads to coordinate their activities.

The Virtual File System Driver

The virtual file system driver 160 services I/O requests sent by the I/O manager 131 on behalf of the control application 270 as well as on behalf of other applications that gain access to the virtual files stored in the virtual file system 164. As explained further below, the control application 270 can request that the virtual file system driver 160 create one or more device objects that represent virtual disks and mount virtual file systems on the virtual disks 155.

Once a virtual file system has been mounted, the virtual file system driver 160 can service file system I/O requests with respect to the mounted virtual file system sent by the I/O manager 131 on behalf of the user applications 110. Preferably, the virtual file system driver 160 uses the control application 270 to obtain from the data repository system 210 the location of native files that serve as prototypes to virtual files. The virtual file system driver 160 also uses the control application 270 to extract prototype files which have been requested but which are not present on a native disk 150. The virtual file system driver 160 also uses the control application 270 to obtain a list of items and containers from the data repository system 210 that should be represented as virtual files and virtual folders. Finally, the virtual file system driver 160 uses the native file system driver 140 when responding to requests for accesses to the virtual files. The requested file access may be, for example, open, close, read or write.

In the Windows NT operating system 130, when a program thread opens a handle to a file object, the I/O manager 131 determines from the file object's name which driver the I/O manager 131 must call to process requests relating to the virtual file. The I/O manager 131 uses driver objects and device objects to achieve this. A driver object represents an individual driver in the data processing system 100 and records for the I/O manager 131 the address of each of the driver's dispatch routines (entry points). A device object represents a physical, logical or virtual device in the data processing system 100 and describes the device's characteristics, such as the alignment the device requires for buffers and the location of the device's queue to hold incoming I/O request packets. When a driver is loaded into the data processing system 100, the I/O manager 131 creates a driver object, then calls the driver's initialization routine so that the driver object is filled with the driver's entry points.

The virtual file system driver 160 includes function routines which parallel the function routines of the native file system 140. However, the function routines of the virtual file system 160, in general, provide calls to the parallel function routines of the native file system 140. Open, read and write requests are typically the most complex function routines in a file system driver, yet in accordance with the invention, the function routines for open, read and write requests are very simple—essentially calls to the open, read and write functions of the native file system 140. Some of the function routines of the virtual file system 160 are handled differently, though this is only a small number and the routines are relatively straightforward to create. Through the virtual file system driver 160, each virtual disk 155 has a device object, and each virtual disk 155 looks to the operating system 130 as if it were a real device. A driver object is associated with the virtual file system driver 160.

In one embodiment, the virtual file system driver 160 comprises a control command handler 163, a file system recognizer 162, a virtual repository manager 166, a virtual device handling core 165, a virtual file system 164, a virtual file supervisor 168, a prototype file filter 167, and a request dispatcher 161. The virtual file system driver 160 may be structured in other ways without departing from the invention. These components are described further below as one example of how to embody the virtual file system driver 160.

The control command handler 163 is responsible for interfacing the control application 270 with other components of the virtual file system driver 160. In the preferred embodiment this is achieved by representing the control command handler 163 with a named device object accessible to the control application 270. The control application 270 opens this device object via Win32 function CreateFile as applied to opening device objects. Once the device object has been opened the control application 270 can call it using Win32 function DeviceIoControl. On behalf of this function the I/O manager 270 sends an IRP_MJ_DEVICE_CONTROL request to the control command handler's device object, supplying the request with parameters passed to DeviceIoControl by the control application 270.

In order to support calls directed from components of the virtual file system driver 160 to the control application 270, the control command handler 163 and the control application 270 use a shared event object that is set to signaled state when the control command handler needs to call the control application 270. When the control application 270 detects that the shared event object is set to the signaled state, it sends a special request (as described above) to the control command handler 163. After handling this special request the control command handler 163 returns to the control application 270 a description of the required data. After the control application 270 receives the required data description, the control application 270 prepares the required data and calls the control command handler 163, submitting the required data as request parameters.

In addition to the above described special requests the control command handler 163 also handles requests received from the control application for creating and deleting virtual disks.

The virtual device handling core 165 receives and handles I/O requests for the virtual disks 155. In particular, the virtual device handling core 165 handles the following Windows NT standard I/O requests: IRP_MJ_CREATE; IRP_MJ_CLOSE; IRP_MJ_CLEANUP; IRP_FILE_SYSTEM_CONTROL; IOCTL_DISK_GET_MEDIA_TYPES; IOCTL_DISK_GET_DRIVE_GEOMETRY; IOCTL_DISK_GET_PARTITION_INFO; IOCTL_DISK_VERIFY; IOCTL_DISK_IS_WRITABLE. The implementation of these I/O requests is within the skill of the ordinarily skilled artisan and therefore not explained here in detail.

The file system recognizer 162 is registered with the operating system 130 as a device object of the FILE_TYPE_DISK_FILE_SYSTEM type. The file system recognizer 162 services the IRP_MJ_FILE_SYSTEM_CONTROL request with the minor code IRP_MN_MOUNT_VOLUME. Upon receiving of such request, the file system recognizer 162 determines if the request is for mounting a virtual file system on a virtual disk 155. The file system recognizer 162 does this by comparing a device object passed as a parameter of the mount request with device objects stored in the list of available virtual disks. If none of device objects stored in the list of available virtual disks matches the given device object, the file system recognizer 162 completes the request with a code identifying that the requested device was not recognized.

Once an appropriate device object has been located in the list of available virtual disks, the file system recognizer 162 mounts a virtual file system on the corresponding virtual disk 155. This is preferably achieved by the file system recognizer 162 invoking the IoCreateDevice service routine to create a device object of type FILE_DEVICE_DISK_FILE_SYSTEM that represents the virtual file system mounted on the virtual disk 155. After the virtual file system device object has been created, the file system recognizer 162 creates a descriptor of a repository view (that includes the repository containers and items) destined to be mapped on the virtual disk, and couples the descriptor of the repository view with the device object representing the virtual file system.

After the device object has been coupled with a descriptor of the repository view, the file system recognizer 162 inserts a pointer to the virtual file system device object into the DeviceObject field of the volume parameter block (VPB) that is passed as one of the mount request parameters. Next, the file system recognizer 162 inserts a pointer to the device object representing the virtual file system into the list of available virtual disks. Then the file system recognizer 162 reports the successful completion of the mount request to the I/O manager 131.

The virtual file system 164 is a component coupled with a device object that represents a virtual disk 155. The virtual file system 164 is mounted on the virtual disk 155 and is registered with the operating system as a device object of the FILE_TYPE_DISK_FILE_SYSTEM type.

The virtual file system 164 appears as a conventional file system intended to service I/O requests for accessing what appear to be ordinary, native-type files and folders that reside on a virtual disk 155. Unlike conventional file systems, however, the virtual file system 164 services I/O requests directed to virtual files and virtual folders in such a way that most I/O requests are actually handled and completed by the native file system driver 140.

When the virtual file system 164 handle IRP_MJ_CREATE request is sent by the I/O manager 131 on behalf of an application that opens a virtual file or virtual folder, the virtual file system 164 uses the virtual repository manager 166 to find or create a native file on a native disk 150 that serves as a prototype of the virtual file that is targeted by the IRP_MJ_CREATE request. Next, the virtual file system 164 corrects a file object structure created by the I/O manager 131 to represent a virtual file being opened on the virtual disk 155. Namely, the virtual file system 164 changes the DeviceObject field of file object structure that defines a virtual disk 155 where the corresponding file is located with the device object representing the native disk 150 where the prototype file is located. In addition, the virtual file system 135 changes the FileName field of the file object structure (that defines the pathname of the corresponding file) with the pathname of the prototype file on the native disk 150.

Next, the virtual file system 164 passes the modified request to an appropriate native file system driver 140. The native file system driver 140 handles the request as if it was received directly from the I/O manager 131. This provides two benefits. First, the file object is initialized in such a way that the I/O manager 131 will call the native file system driver 140 directly (bypassing the virtual file system driver 160) for all subsequent requests (read, write, close, etc.) directed to the virtual file or folder that was subject of the IRP_MJ_CREATE request. Second, the native file system driver 140 will be able to successfully handle these requests although they are actually issued on behalf of operations performed on a virtual file.

In addition to opening virtual files, the virtual file system 164 receives and handles I/O requests that pertain to the virtual disk 155 themselves. In particular, the virtual file system 164 handles IRP_MJ_QUERY_VOLUME_INFORMATION and IRP_MJ_SET_VOLUME_INFORMATION. The implementation of these I/O requests is within the skill of the ordinarily skilled artisan and therefore not explained here in detail.

The virtual repository manager 166 determines the contents of virtual folders being represented on the virtual disks 155, as well as locates and creates prototype files. The virtual repository manager 166 acts on behalf of the other components of the virtual file system driver 160 and interfaces with the control command handler 163 that provides access to the data repository system 210.

When interfacing with the control command handler 163, the virtual repository manager 166 creates command messages that are sent by the control command handler 163 to the control application 270. In particular, acting on behalf of the virtual file system 164, the virtual repository manager 166 creates command messages that provide obtaining the contents of a repository container. Furthermore, acting on behalf of the virtual file supervisor 168, the virtual repository manager 166 creates command messages for obtaining the location of a prototype file or folder on a native disk and for creating a prototype file if not present on the native disk 150. In addition, the virtual repository manager 166 creates descriptions that represent virtual files being opened on a virtual disk 155.

A file object extension appears as an extension to the file object structure created by the I/O manager 131 in conformity to a file being opened on a virtual disk 155. A file object extension contains a pointer to the file object created by the I/O manager 131 in conformity to a file being opened on a virtual disk 155. Next, a file object extension contains the pathname of a virtual file that addresses it on the virtual disk 155. Finally, a file object extension contains the pathname of an appropriate prototype that resides on a native disk 150. In other words, a file object extension provides multiple links between a file object created by the I/O manager 131, a location of the corresponded virtual file on the virtual disk 155, and a location of the corresponding prototype file on the native disk 150.

The virtual file supervisor 168 keeps track of operations performed on opened virtual files. The virtual file supervisor 168 also handles requests that require co-handling with the native file system driver 140. Namely, the virtual file supervisor 168 handles and co-handles IRP_MJ_CLEANUP, IRP_MJ_CLOSE, IRP_MJ_QUERY_INFORMATION, IRP_MJ_SET_INFORMATION and IRP_MJ_DIRECTORY_CONTROL I/O requests.

The prototype file filter 167 is a device object that is attached to the native file system driver 140 in accordance with the filter driver specification that is used in the Windows NT operating system. The prototype file filter 167 intercepts I/O requests targeted to the native file system driver 140 and checks whether the intercepted I/O request pertains to a file that appears as a prototype of an opened virtual file. If so, then the prototype file filter 167 calls the virtual file supervisor 168 with the intercepted request or passes the request down to the native file system driver 140 depending on the request type. If the intercepted request is not targeted to a prototype file, the prototype file filter 167 simply passes the intercepted request down to the native file system driver 140.

The request dispatcher 161 receives the I/O requests sent by the I/O manager 131, identifies the device object that is targeted by the I/O request, and invokes the appropriate routine that is responsible for handling request of the given type. If the I/O request is targeted to the device object representing the control command handler 163, then the request dispatcher 161 invokes the control command handler 163 and passes the current request to it. If the I/O request is targeted to the device object representing the file system recognizer 162, then the request dispatcher 161 invokes the file system recognizer 162 and passes the current request to it. If the I/O request is targeted to a device object representing a virtual disk 155, then the request dispatcher 161 invokes the virtual device handling core 165 and passes the current request to it. If the I/O request is targeted to a device object representing the virtual file system 164, the request dispatcher 161 invokes the virtual file system 164 and passes the current request to it.

The virtual file system driver 160 maintains a list of available virtual disks 155 as well as a list of virtual disks 155 pending deletion. The virtual file system driver 160 uses these lists to account for available virtual disks 155. Each of the lists appears as a list of pointers to a data structure consisting of an assigned drive letter, a pointer to a device object that represent the respective virtual file system 164, and a pointer to a device object that represent a virtual disk. The virtual file system driver 160 also maintains a list of file object extensions and uses the lists to account for opened virtual files.

Operation of the System of the Invention

The operation of the system of the invention has several aspects. First, there are certain initialization operations. Second, there are operations relating to creating and deleting virtual disks. Third, there are operations relating to mounting and unmounting virtual file systems on virtual disks. Fourth, there are operations relating to file access services: open, close, delete, read and write. Fifth, there are operations relating specifically to virtual folders. It should be appreciated that the terms "file access service request," "file access request" and "I/O request" are used interchangeably herein.

For initialization, the virtual file system driver 160 includes a driver entry initialization routine referred to as the "driver initialization routine." The driver initialization routine is invoked by the I/O manager 131 and initializes the function pointers in the driver object structure including both the major function pointers to the dispatch routines and the function pointers to the fast I/O dispatch routines. As applied to the major function pointers the driver initialization routine initializes the entry points to all major function to the request dispatcher 161. As applied to the function pointers to the fast I/O dispatch routines the driver initialization routine initializes the different entry points to appropriate fast I/O routines. Next, the driver initialization routine creates a device object that represents the file system recognizer that is served to handle mount requests. In addition, the driver initialization routine creates a device object that represents the control command handler 163.

Creating And Deleting Virtual Disks

After initialization, the virtual file system driver 160 can create and delete virtual disks 155. There are at least two avenues for creating a new virtual disk. In the embodiment disclosed, the only avenue is for the user to first create a virtual file system, and then to have a virtual disk created which is mapped to the virtual file system. However, a second avenue is also within the scope of the invention wherein the user has a new virtual disk created with an empty virtual file system. Only the former avenue is described in detail herein; embodying the latter avenue is within the skill of the ordinarily skilled artisan based upon this disclosure.

Figure 3:
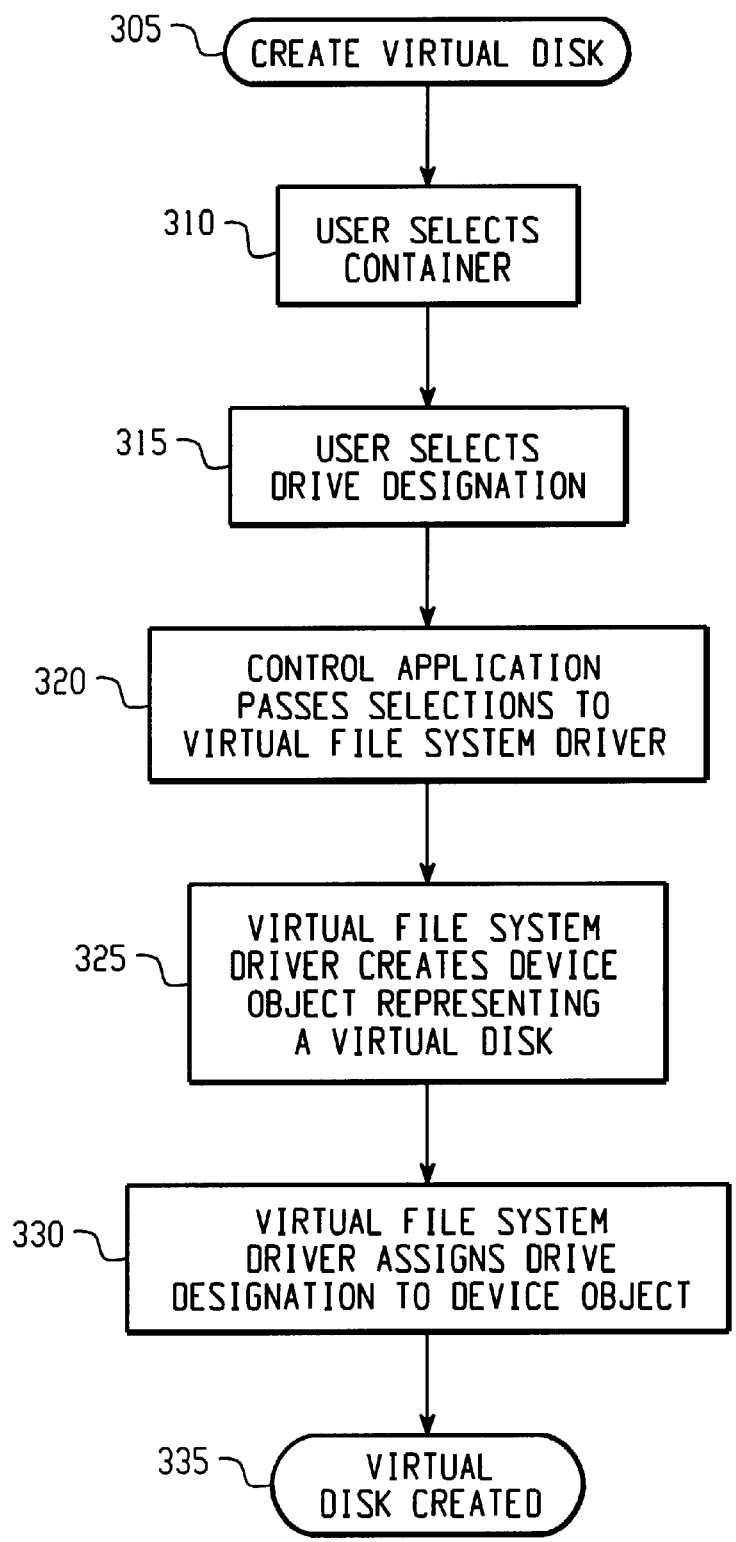
FIG. 3 is a flow chart of a process for creating a virtual disk in accordance with the invention.

Creation of a new virtual disk is described with reference to FIG. 3. When creating a virtual disk (step 305), a user preferably uses the control application 270 to select a container from the data repository system 210 (step 310). The selected container will act as a root folder for the new virtual disk. The control application preferably defaults the virtual folder's name to the name of the selected container, but also permits the user to select a different name for the virtual folder. Next, the control application 270 preferably suggests a drive designation to the user, and the user selects an available drive designation (step 315).

The control application 270 then instructs the virtual file system driver 160 to create a new virtual disk 155 from the user's selections (step 320). As explained above, the virtual file system driver 160 is responsive to control commands sent by the I/O manager 131 on behalf of the control application 270. When creating a virtual disk, the control application 270 preferably uses the Windows DeviceIoControl function to send a control code and attributes of the new virtual disk directly to the control command handler 163. Preferably, the control command includes a designation of the selected drive letter as well as the selected attributes of the virtual disk The control command handler 163 creates a device object representing a virtual disk by using the IoCreateDevice( ) service routine (step 325). The control command handler 163 also creates a symbolic link to the device object by using the IoCreateSymbolicLink( ) service routine (step 330). In this way a required drive letter gets assigned to the created virtual disk. After the device object representing the virtual disk 155 has been created, the control command handler 163 inserts a pointer to the device object into the list of available virtual disks. At this point, the new virtual disk 155 will be recognized by the operating system 130 as if it were a native disk 150 (step 335). For example, an icon for the virtual disk will appear in the Windows Explorer within My Computer.

Figure 4:
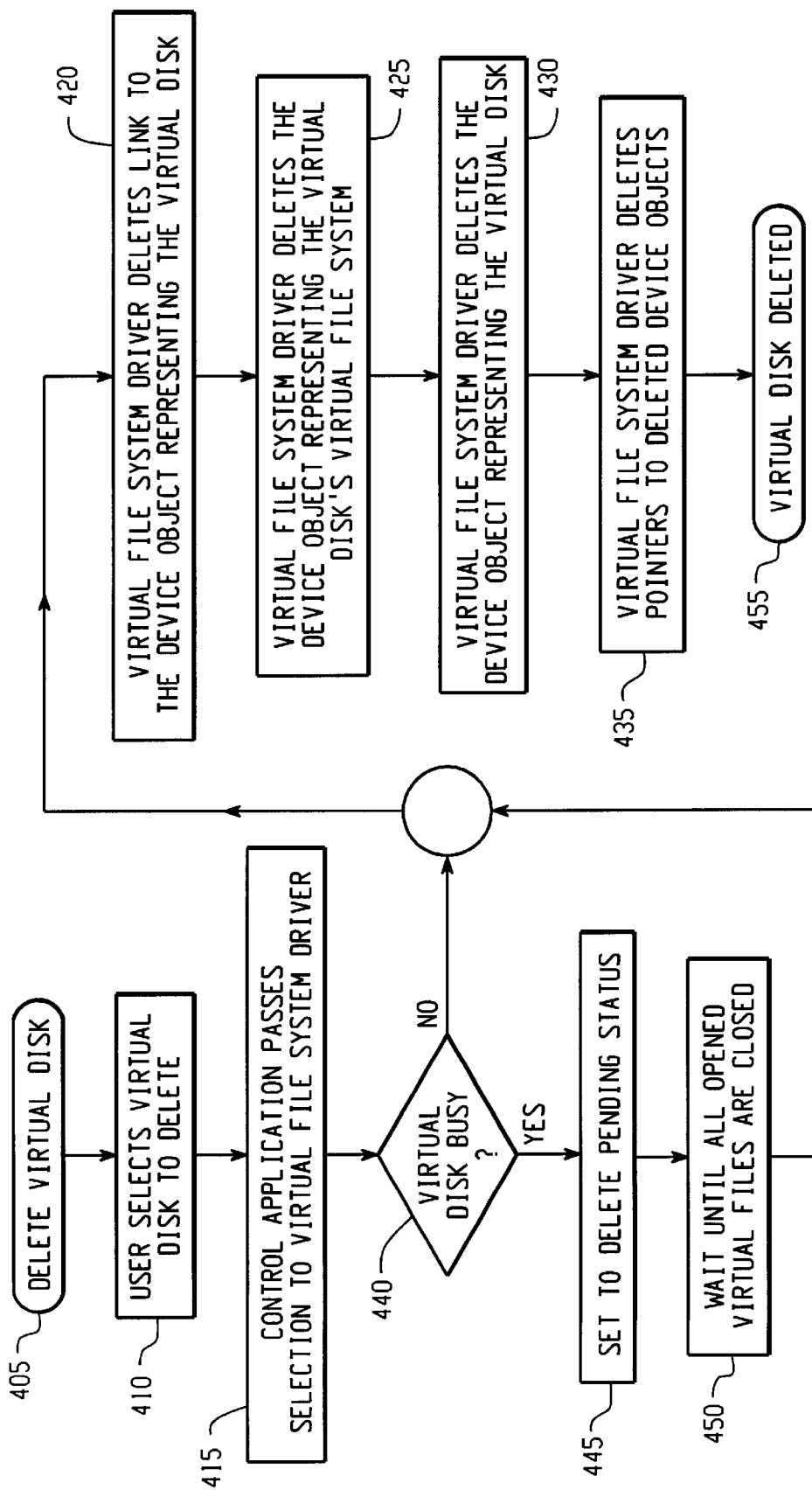
FIG. 4 is a flow chart of a process for deleting a virtual disk in accordance with the invention.

Deletion of a virtual disk is described with reference to FIG. 4. When deleting a virtual disk (step 405), a user preferably uses the control application 270 to select a virtual disk to delete (step 410). Preferably, in Windows, the control application 270 provides a context menu item for a dialog which permits the user to select a virtual disk for deletion. After the user has made his selection, the control application 270 then instructs the virtual file system driver 160 to delete the selected virtual disk 155 (step 415).

When the virtual file system driver 160 receives the command for deleting a virtual disk 155, the control command handler 163 deletes a link to the device object for the selected virtual disk (step 420). Preferably, this is performed using the IoDeleteSymbolicLink( ) service routine. In this way the drive letter assigned to the virtual disk is made available again and can be assigned to other devices. For example, an icon for the virtual disk will disappear from the Windows Explorer within the "My Computer" portion of the Windows shell namespace.

Next, the control command handler 163 deletes the device object representing the virtual file system mounted on the virtual disk (step 425). Preferably, this is performed using the IoDeleteDevice( ) service routine. Next, the control command handler 163 deletes the device object representing the virtual disk 155 (step 430). Preferably, this is also performed using the IoDeleteDevice( ) service routine. After the device object representing the virtual disk 155 has been deleted, the control command handler 163 deletes the pointers to the device objects representing the virtual disk 155 and virtual file system from the list of available virtual disks 155 (step 435). At this point, the delete process is complete (step 455).

If the virtual file system of the selected virtual disk has virtual files in an open state (step 440), then the deletion is preferably delayed to handle the situation. First, the control command handler 163 preferably removes the device objects representing the selected virtual disk 155 and its corresponding virtual file system from the list of available virtual disks and inserts them into list of delete-pending virtual disks (step 445). The control command handler 163 preferably also sets a flag in the virtual file system device extension which prevents any new open requests from being handled for the virtual file system. The control command handler 163 then creates a system thread that permanently checks if there still are opened virtual files or virtual folders on the selected virtual disk (step 450). As soon as number of the opened virtual files and virtual folders drops to zero the control command handler 163 completes the delete operation (step 420).

Mounting Virtual File Systems

Figure 5:
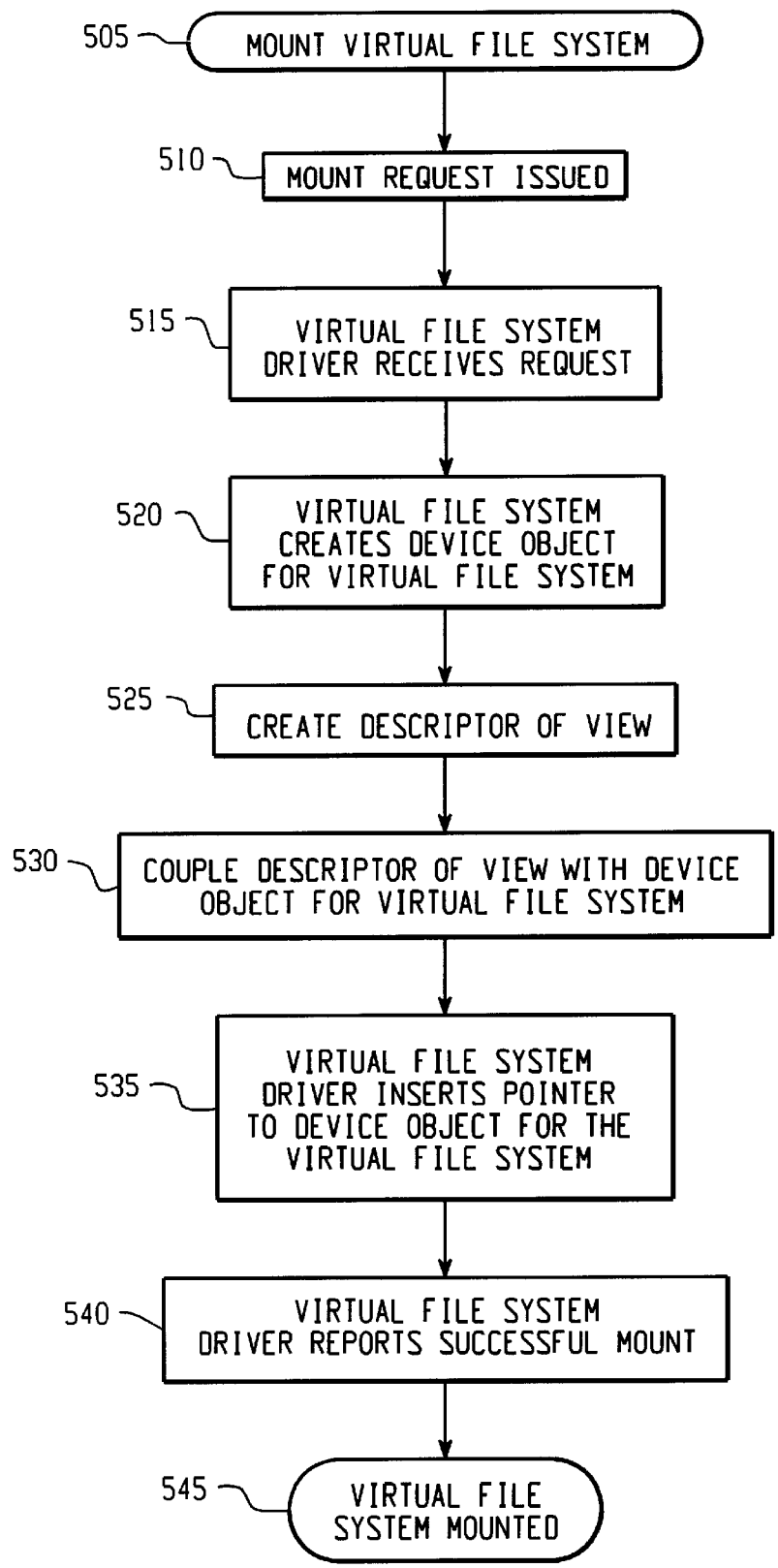
FIG. 5 is a flow chart of a process for mounting a virtual file system in accordance with the invention.

After a virtual disk 155 has been created, an instance of the virtual file system associated with the virtual disk 155 must be mounted on the newly created virtual disk in order for the virtual file system to become accessible to the operating system 130. The process of mounting is explained with reference to FIG. 5.

The process (step 505) starts for almost any operating system when a mount request is issued (step 510). In some operating systems, the mounting of a file system can be initiated by a user. In Windows NT, the mounting process starts when the I/O manager 133 has a file system I/O request to send to a logical disk (which might be either a native disk or a virtual disks). Prior to issuing the I/O request, the I/O manager 133 will determine whether the file system of the indicated logical disk has been mounted. If not, then the logical disk is mounted by the corresponding file system driver. One of the parameters of the I/O manager's request is a pointer on the VPB (Volume Parameter Block) belonging to the target logical disk.

When the I/O manager's mount request reaches the file system recognizer 162, the file system recognizer 162 recognizes that requested logical disk is a virtual disk (step 515). Next, the file system recognizer 162 invokes the IoCreateDevice service routine to create a device object of type FILE_DEVICE_DISK_FILE_SYSTEM that represents the virtual file system mounted on the virtual disk 155 (step 520).

Next, the file system recognizer 162 creates a descriptor of a view destined to be mapped on the virtual disk 155 (step 525). Preferably, this view is obtained from the data repository system 210 and includes the repository containers and items which will correspond to the virtual folders and files in the virtual file system. However, the view could be representative of all or a portion of a native file system.

The file system recognizer 162 then couples the descriptor of the view with the device object representing the virtual file system (step 530). Next, the file system recognizer 162 inserts a pointer to the virtual file system device object into the DeviceObject field of the volume parameter block (VPB) and into the list of available virtual disks (step 535). Lastly, the file system recognizer 162 reports to the I/O manager 133 about successful completion of the mount request (step 540). Thus, the mount is complete (step 545) and the I/O manager 133 can proceeds with the original I/O request.

File Access Services

Most requests for file access services are essentially handled by passing the request to the native file system. This general process is described with respect to opening a file, although the procedure is easily translated to other I/O requests. After this process is described, the processes for exceptional types of file access services are described. For these exceptional I/O requests, the native file system driver 140 is either not used or co-processes with the virtual file system driver 160. The exceptional I/O requests include file close, file cleanup, query file information, set file information, file system control, and directory control.

Figure 6:
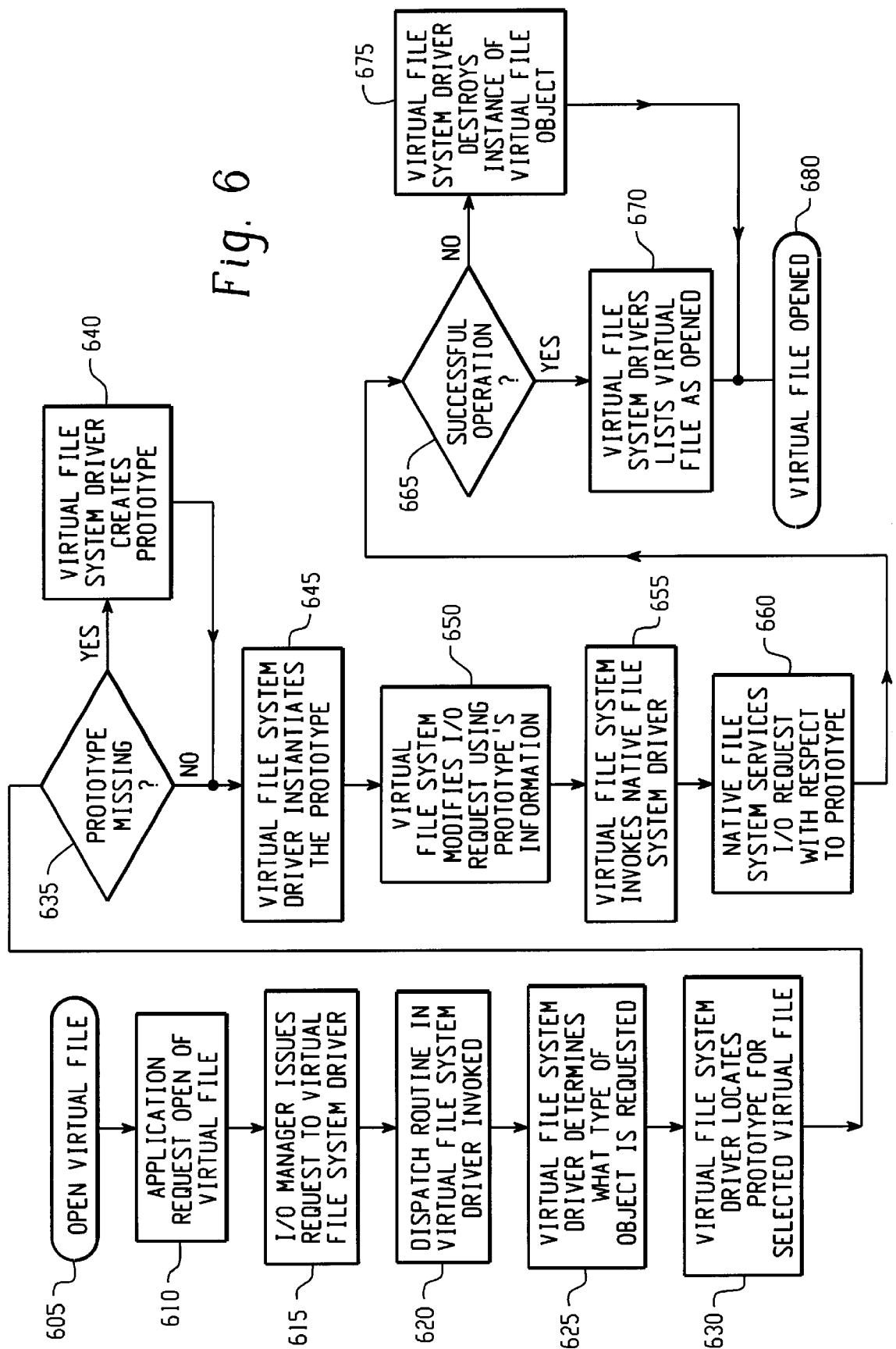
FIG. 6 is a flow chart of a process for handling an I/O request such as file open with respect to a virtual file in accordance with the invention.

Referring now to FIG. 6, the process for opening a file is described. The process begins at step 605. When an application request that a virtual file be opened (step 610), the I/O manager 133 issues an IRP_MJ_CREATE request with appropriate parameters to the virtual file system driver 160 which serves the virtual disk 155 having the requested virtual file (step 615).

The IRP_MJ_CREATE request then goes to the request dispatcher 161. The request dispatcher 161 in turn invokes an appropriate dispatch routine that appears as a component of the virtual file system 164 (step 620). The dispatch routine for the purposes of this example will be referred to as the "Create dispatch routine." The Create dispatch routine then determines whether a virtual volume or a virtual file is the target of the request (step 625). In the disclosed embodiment, the Create dispatch routine checks a FileName field in the appropriate file object structure. If the FileName field has zero length, a virtual volume is the target of the request. Otherwise, a virtual file is the target of the request, and the FileName field comprises a pathname, wherein the last path element of the pathname is the name of the requested virtual file.

If a virtual file is the target of the request, the next step is to determine the location of a prototype for virtual file (step 630). If a data repository system contains an item or container that can be retrieved as a prototype for virtual file or folder, the Create dispatch routine invokes the virtual repository manager 166 and passes the pathname to it. The virtual repository manager 166 then finds a repository container or item appropriate to the given virtual file. The virtual repository manager 166 then determines the location of the prototype of the virtual file on the indicated native disk.

The virtual repository manager 166 tests if the prototype is missing on the native disk drive (step 635). If the prototype is missing, then the virtual file system driver 160 issues commands to create the prototype (step 640). In particular, the virtual repository manager 166 sends a command message to the control application 270 for creating an appropriate prototype file on the native disk.

Once the prototype file has been found or created on the native disk, the virtual repository manager 166 creates an instance of the file object extension that represents the requested virtual file (step 645). Preferably, the virtual repository manager 166 fills the instance of the file object extension with the path to the prototype and supplies the caller (i.e. the Create dispatch routine) with a pointer to the instance of the file object extension. The Create dispatch routine then fills the instance of the file object extension with the pointer to the file object. Next, the Create dispatch routine invokes the virtual file supervisor 168 and passes to it the completed instance of the file object extension.

The virtual file system driver 160 then changes the I/O request from the I/O manager 133, to make it possible for a native file system driver to successfully handle the request. To do this, the virtual file supervisor 168 overrides the values of the DeviceObject and FileName fields of the file object structure created by the I/O manager 133. More particularly, the virtual file supervisor 168 inserts into the DeviceObject field the pointer to the device object representing the native disk which stores the prototype, and the virtual file supervisor 168 inserts into the FileName field the path to the prototype.

Next, the Create dispatch routine invokes the native file system driver 140 which services the native file system having the prototype, and passes to that native file system driver 140 the transformed I/O request (step 655). The native file system driver 140 then services the transformed I/O request (step 660).

When the native file system driver 140 completes the given I/O request, the Create dispatch routine checks whether the I/O request has been completed with success (step 665). If the I/O request has been completed with success, the Create dispatch routine inserts a pointer to the instance of the file object extension into the list of opened virtual files and returns to the I/O manager 133 (step 670). Otherwise, the Create dispatch routine destroys the instance of the file object extension and returns the error to the I/O manager 133 (step 675). In either case, the process is complete (step 680).

In sum, when the virtual file system driver 160 receives an I/O request directed to a virtual file, the virtual file system driver 160 employs the native file system driver 140 to handle that request on a native file which is a prototype of virtual file. As a result, subsequent I/O requests pertaining to the virtual file will be issued directly to the native file system driver and the native file system driver services the I/O requests with its own routines.

As mentioned, there are a number of I/O requests which have special handling. These exceptional I/O requests are detected by the prototype file filter 167. If the intercepted I/O request pertains to a native file that appears as a prototype of a virtual file, then the prototype file filter 167 checks whether the request matches one of the exceptional I/O request types. If so, the prototype file filter 167 calls an appropriate routine of the virtual file supervisor 168.

One of the exceptional I/O requests is file close. Upon intercepting an IRP_MJ_CLOSE request, the prototype file filter 167 invokes the virtual file supervisor 168 and passes to it the intercepted request. The virtual file supervisor 168 determines the targeted virtual file and deletes the corresponding file object extension from the list of open virtual files. Then virtual file supervisor 168 destroys the file object extension created as applied to the target virtual file.

Another of the exceptional I/O requests is file cleanup. Upon intercepting an IRP_MJ_CLEANUP request, the prototype file filter 167 invokes the virtual file supervisor 168 and passes to it the intercepted request. The IRP_MJ_CLEANUP requests are exceptional because they may require deletion of a virtual file from the virtual disk 155. In order to handle an IRP_MJ_CLEANUP request the virtual file supervisor 168 passes the request to the native file system, and if it succeeds then the virtual file supervisor 168 checks the Flags field in the file object structure representing the target file. If the current value of the Flags field is relevant to the file deletion, then the virtual file supervisor 168 notifies the virtual repository manager that the given virtual file has been deleted.

Another of the exceptional I/O requests is query file information. Upon intercepting an IRP_MJ_QUERY_INFORMATION request, the prototype file filter 167 invokes the virtual file supervisor 168 and passes to it the intercepted request. The IRP_MJ_QUERY_INFORMATION requests are exceptional because there are two types of the request: FileNameInformation and AlternateFileNameInformation that must be completed by the virtual file system driver 160. If the query file information request is of the FileNameInformation type, then the virtual file system driver 160 provides to the requester the full pathname to the target virtual file. If the query file information request is of the AlternateFileNameInformation type, then the virtual file system driver 160 provides to the requester the short (alias) name of the given virtual file. In either case, the requested information concerns the virtual file, not the prototype file, so the virtual file system driver 160 has to complete the request without invoking the native file system driver 140.

Another of the exceptional I/O requests is set file information. Upon intercepting an IRP_MJ_SET_

INFORMATION request, the prototype file filter 167 invokes the virtual file supervisor 168 and passes to it the intercepted request. The IRP_MJ_SET_INFORMATION requests are exceptional because they may require renaming of a virtual file. In order to handle an IRP_MJ_SET_INFORMATION request the virtual file supervisor 168 passes the request to the native file system 164. If the native file system 164 succeeds in renaming the virtual file, then the virtual file supervisor 168 notifies the virtual repository manager 166 that the given virtual file has been renamed.

Folder Services

As with other virtual files, when the virtual file system driver 160 receives most types of I/O requests directed to virtual folders, the virtual file system driver 160 employs the native file system driver 140 to handle those requests on native folders which are the prototypes of the targeted virtual folders. However, with respect to virtual folders, there are a number of I/O requests which also have special handling.

Only one of these exceptional virtual folder I/O requests is discussed here—that for directory control. Upon intercepting the IRP_MJ_DIRECTORY_CONTROL request, the prototype file filter 167 invokes the virtual file supervisor 168 and passes to it the intercepted request. The virtual file supervisor 168 checks whether the request is a request to obtain the contents of a virtual folder. In particular, the virtual file supervisor 168 checks the minor code of the request, and if the value of the code is not equal to the IRP_MN_QUERY_DIRECTORY, then the virtual file supervisor 168 completes the request with an error. Otherwise, the request is treated as a request to obtain the contents of a virtual folder and the virtual file supervisor 168 services the request.

Before servicing the request, the virtual file supervisor 168 checks whether the request is the first request to obtain the contents of the specified virtual folder. If the request is the first such request, then the virtual file supervisor 168 saves the search pattern supplied by the caller. Then the virtual file supervisor 168 calls the virtual repository manager 166 to search the list of virtual folders for a match, and the virtual repository manager 166 passes back the pathname of the matching virtual folder.

Given the pathname of the virtual folder, the virtual repository manager 166 creates the command message for obtaining the contents of the container that resides in the data repository system 210 and is represented on the virtual disk 155 as the specified virtual folder. Then the virtual repository manager 166 sets the event object that signals the control application 270 that a command message has been issued. After the event object has been set, the virtual repository manager 166 waits to receive the contents of the specified repository container.

After the control application 270 fetches the command message and delivers the contents of the specified repository container, the repository manager 166 services the request for obtaining the contents of the specified virtual folder. In particular, the virtual repository manager 166 determines the folder entries that match the search pattern and creates a list of folder entries that match the search pattern (hereafter referred to as a secondary list of matched folder entries). After the secondary list has been created, the virtual repository manager 166 invokes the folder enumeration facilities of the native file system 140 to determine the entries that belong to the prototype folder and match the search pattern.

As a result of using these enumeration facilities the virtual repository manager 166 creates yet another list of folder entries that match the search pattern (hereafter referred to as a primary list of folder matched entries). Once both of the lists of matched folder entries have been created, the virtual repository manager 166 creates a conjunct list of matched folder entries covering both the primary and secondary lists of matched folder entries. Then, the virtual repository manager 166 returns the conjunct list of matched folder entries to the virtual file supervisor 168.

Upon receiving the conjunct list of the matched folder entries, the virtual file supervisor 168 preferably includes in the conjunct list an entry for DESKTOP.INI file that enables using of the view application 220. Thus, the virtual file supervisor 168 causes the browser application 230 (that appears as the standard shell of the operating system 130) to be switched from using its inherited view component to using the view component contained in the view application 220. Then the virtual file supervisor 168 saves the conjunct list for further use in subsequent requests. Once the conjunct list has been created and saved, further handling of the request is considered within the skill of one of ordinary skill in the art.

Thus, by creating and using the conjunct list of matched folder entries, the virtual file supervisor 168 maps to the virtual disk both the files that can be retrieved from the data repository system 210 as well as the files that reside on the native disk.

The View Application

Referring again to FIG. 2, the view application 220 will be described. The view application 220 represents a custom view of the folders and files that reside on the virtual disk 155. The view application 220 appears as a user mode 240 application that is joined with the browser application 230.

According to one aspect of the invention, the view application 220 represents virtual files and virtual folders and their attributes. The view application 220 has access to both the native file system 133 and the data repository system 210. As a result of this, the view application 220 can represent both a set of conventional file attributes provided by the native file system 133 and a set of additional file attributes provided by the data repository system 210. In particular, the view application 220 is capable of representing one or more attributes that files extracted from the data repository system 210 inherit. Additionally, the view application 220 is capable of representing one or more calculated attributes that derive from a comparison operation which takes as inputs the file that serves as a prototype of a virtual file and an item that can be retrieved from the data repository as the prototype file.

The view application 220 preferably is not limited to representing virtual files and virtual folders. Rather, the view application 220 preferably can be used to represent other objects. These objects need not be files or data associated with files. However, the view application 220 permits these objects to be viewed and handled by the user as if they were files, folders and other objects which are included in the native file system.

Figure 7:
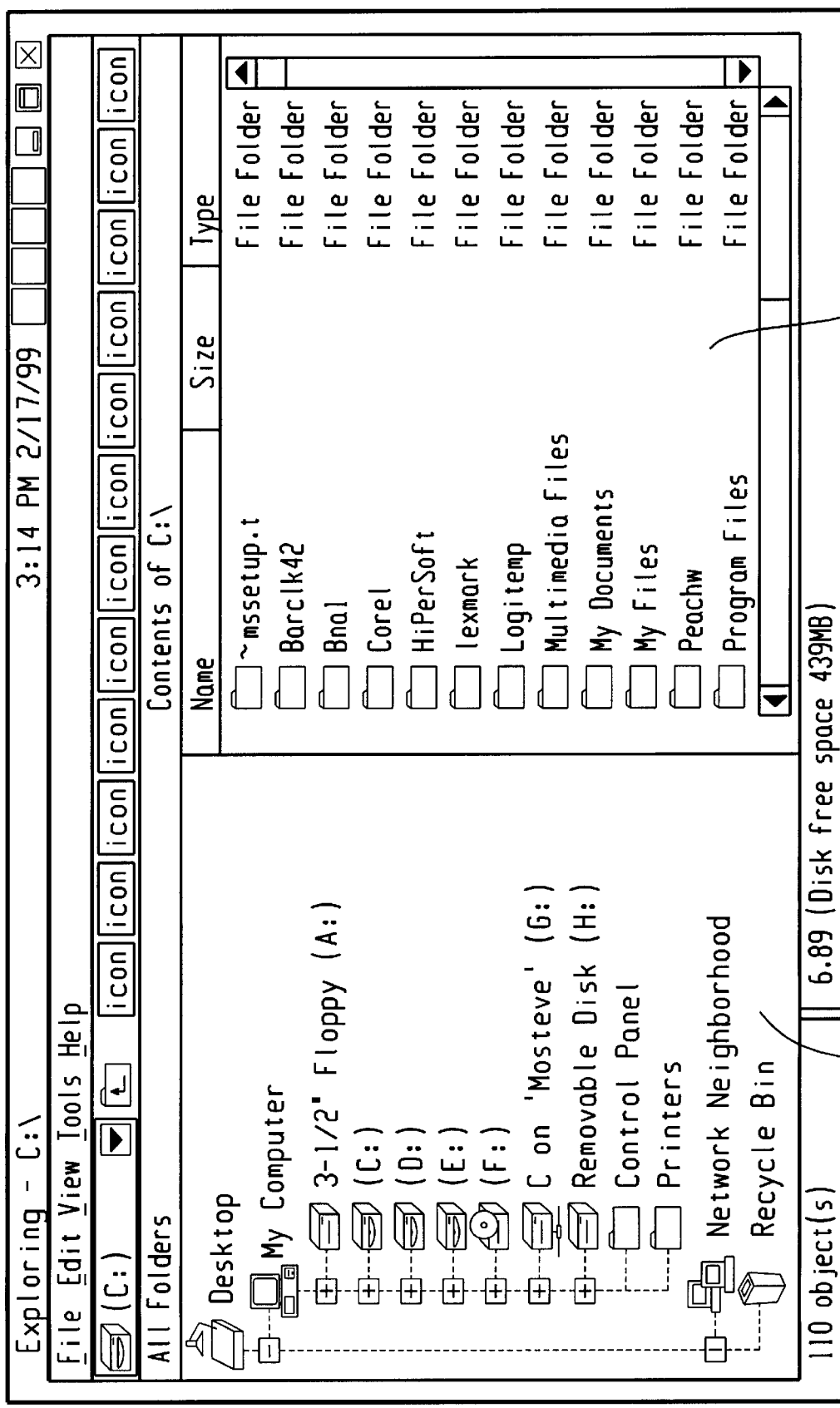
FIG. 7 is a screen shot of a prior art default view of a file system using Windows Explorer.

In the disclosed embodiment, the browser application 230 is the Windows Explorer, which appears as the shell of the operating system 130. A view of a native file system using Windows Explorer is shown in the screen shot of FIG. 7. The browser application 230 includes a left pane 710 and a right pane 720. The browser application 230 further includes a display 715 of the number of objects in the right pane 720. FIG. 8 shows a view of a portion of a native file system using the browser application 230. The view of FIG. 8 includes, for each native file, an icon 810, a file name 820, a file size 830, a file type 840 and a file time stamp 850. Those of ordinary skill in the art are well acquainted with the Windows Explorer and similar browser applications and so further discussion is not made of the details of the operation of the browser application 230.

Figure 9:
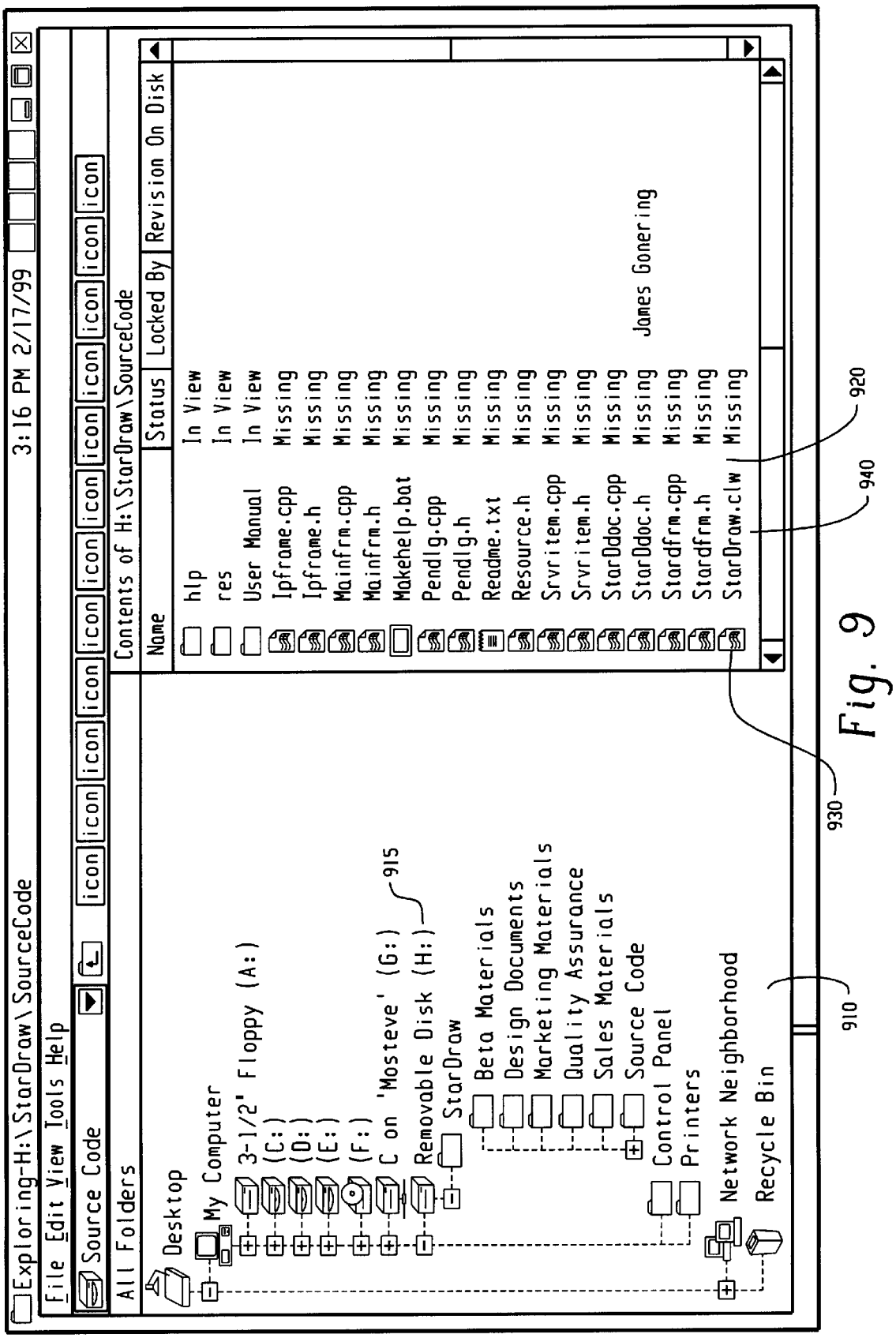
FIG. 9 is a screen shot of a custom view of a virtual file system in accordance with the invention.

FIG. 9 shows a virtual drive in the left pane 910 as logical drive H: (reference 915). The right pane 920 shows icons 930 and names 940 for the virtual files and virtual folders in the virtual drive, in a manner like that of FIG. 7.

The view application 220 appears as a substitute of the default view component of the shell that represents native in the right pane 720. The view application 220 is preferably implemented as an in-process server DLL employing the apartment threading model. The view application 220 preferably exports the standard set of in-process server DLL functions including the DllMain, DllGetClassObject and DllCanUnloadNow functions. The DllMain, DllGetClassObject and DllCanUnloadNow functions are the same as they would be for any in-process server DLL in OLE.

Figure 11:
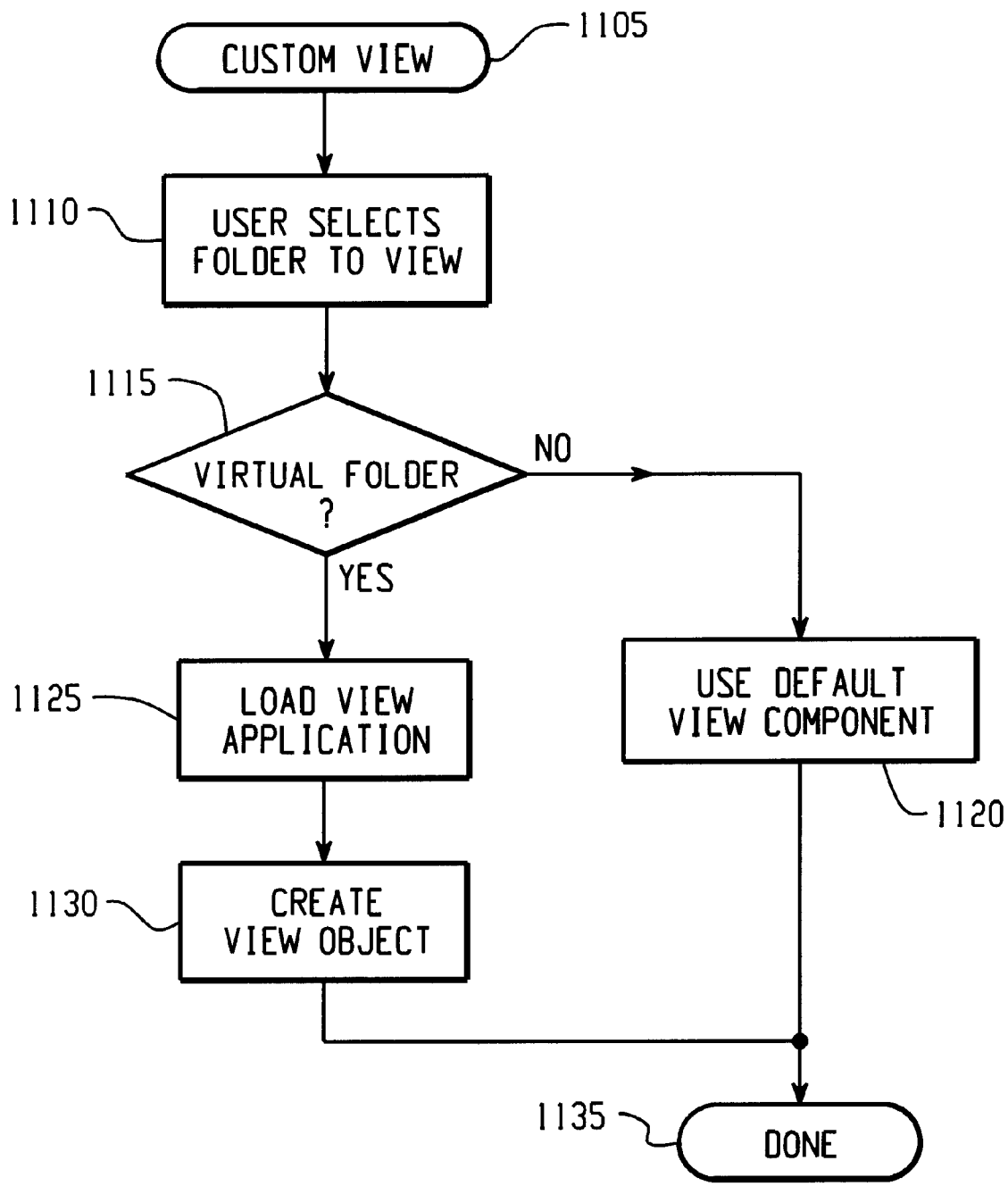
FIG. 11 is a flow chart of providing custom views in accordance with the invention.

Referring now to FIG. 11, the method of providing custom view in accordance with the invention is described. After the method begins (step 1105), the user selects a folder from the browser application 230 to view (step 1110). The type of folder is then tested (step 1115). If the selected folder is a native folder, then the default view component of the browser application 230 is used (step 1120).

In support of this test (step 1115), the virtual file system driver 160 preferably includes in each virtual folder a virtual file named DESKTOP.INI. The DESKTOP.INI preferably stores a user interface class identifier (UICLSID) of the view application 220. When the browser application 230 is requested to obtain a view of a selected virtual folder, instructions in the DESKTOP.INI instruct that the view application 220 be utilized instead of the default view component of the browser application 230.

Thus, if the folder is a virtual folder, the view application 220 is loaded (step 1125). The view application 220 implements an object that exposes the IClassFactory interface for creating a view object, through which the operating system 130 provides a custom view of the virtual files of the selected virtual folder (step 1130). Once either the view application or the default view component has provided the requested view, the method is complete (step 1135).

FIG. 10 shows a view of a portion of a virtual file system using the browser application 230 and the view application 220 of the invention. The custom view provides list of file attributes including both conventional and additional attributes of virtual files. The view application 220 preferably obtains conventional attributes, such as file name 1010, size 120 and type 1030 using standard file functions provided by the operating system 130.

The view application 220 preferably can obtain additional attributes of virtual files from the data repository system 210. For example, the view application 220 preferably can obtain and provide as a file attribute the status 1040 of the virtual file. The status of a virtual file preferably indicates the relationship between a file that currently serves as a prototype of the virtual file, on the one hand, and the tip (most resent) revision of the same file that can be retrieved from the data repository system 210, on the other hand. In the disclosed embodiment, the status of a virtual file may have one of the following values:

Missing—The prototype file is not present on the native disk 150, but in the data repository system 210 there is one or more revisions of the file (that can be retrieved from the data repository system 210) to serve as the prototype for virtual file;

Current—The prototype file is present on the native disk and the tip (latest) revision of the file (that can be retrieved from the data repository system 210 to serve as the prototype for virtual file) are identical;

Modified—The prototype file is present on the native disk has been altered and is based on the tip (latest) revision of this file;

Merge—The prototype file is present on the native disk has been altered but is not based on the tip (latest revision) of this file;

Out of date—The prototype file is present on native disk is a copy of an old revision of the file;

Not in view—The file is present on the native disk, but it is not under version control. In other words, in the data repository system 210 there is not any retrievable revision of the file.

Once the conventional and additional attributes of virtual folders and files are retrieved or/and calculated, further implementing the view application 220 containing a view object that exposes the IShellView interface is considered within the skill of one of ordinary skill in the art.

Other attributes shown in FIG. 10 include whether the virtual file is locked, and if so, then by who 1050, and the revision number 1060 of the virtual file.

Although exemplary embodiments of the present invention have been shown and described, it will be apparent to those having ordinary skill in the art that a number of changes, modifications, or alterations to the invention as described herein may be made, none of which depart from the spirit of the present invention. All such changes, modifications and alterations should therefore be seen as within the scope of the present invention.

It is claimed:

1. A data processing system comprising:
   (a) an operating system responsive to file access service requests of applications programs;
   (b) one or more mass storage devices, each mass storage device comprising one or more native disks, each native disk storing a single native file system, the native file systems comprising native files, the native file systems including names, attributes and locations of the respective native files stored in the native file system;
   (c) one or more native file system drivers, each native file system driver comprising function routines and file management structures for providing file access services to the operating system with respect to at least one of the native file systems, wherein the native file system drivers each provide a single representation of the respective native file systems;
   (d) a virtual file system driver comprising function routines and file management structures for providing file access services to the operating system with respect to virtual files, at least one virtual file comprising a logical representation in a virtual file system of a one of the native files, the logical representations comprising a mapping of the one native file to the at least one virtual file, the virtual file system driver emulating the virtual file system to the operating system as an additional native file system, the virtual file system driver representing the structure of the virtual file systems in a user-defined manner without restriction as to the location of any particular native file in any particular native file system;
   wherein the virtual file system driver, in response to a file access request for a one of the virtual files mapped from a native file, invokes the native file system driver which is associated with the native file system having the mapped native file, the invocation including a reference to the mapped native file.

2. A method of working with native files in a data processing system, the data processing system comprising:

an operating system responsive to file access service requests of applications programs;

one or more mass storage devices, each mass storage device comprising one or more native disks, each native disk storing a single native file system, the native file systems comprising native files, the native file systems including names, attributes and locations of the respective native files stored in the native file system;

one or more native file system drivers, each native file system driver comprising function routines and file management structures for providing file access services to the operating system with respect to at least one of the native file systems, wherein the native file system drivers each provide a single representation of the respective native file systems; and a virtual file system driver comprising function routines and file management structures;

the method comprising:

(a) the virtual file system driver emulating a virtual file system to the operating system as an additional native file system;

(b) a user using the virtual file system driver to map at least one native file available to the user into the virtual file system as a virtual file;

(c) the user using the virtual file system driver to represent the structure of the virtual file system without regard to the representations of the native files in the native file systems;

(d) the virtual file system driver, in response to a file access request for a one of the virtual files, invoking the native file system driver which is associated with the native file system having the mapped native file, the invocation including a reference to the mapped native file.

3. The method of working with native files in a data processing system of claim 2 wherein the virtual files include virtual folders, wherein the step of representing the structure of the virtual file system comprises logically putting in a given virtual folder virtual files and other virtual folders.

4. A data processing system comprising:

(a) an operating system responsive to file and directory access service requests of applications programs;

(b) a mass storage device storing a native file system comprising native files, the file system including names, attributes and locations of the native files;

(c) a first file system driver comprising first function routines and first file management structures, wherein the first file system driver provides a single representation of the native file system;

(d) a mass storage device driver for interfacing the first file system driver to the operating system and providing file access services to the first file system driver with respect to the mass storage device;

(e) a data repository system, the data repository system comprising:

(i) records representative of virtual files, the records for each virtual file comprising a virtual file name and virtual path;

(ii) for at least one virtual file, a prototype name of a prototype for the virtual file, the prototype comprising a one of the native files;

(f) a control application for interfacing the data repository system to the operating system;

(g) a second file system driver comprising second function routines and second file management structures, the second file system driver emulating file access services with respect to the virtual files, the second file system driver providing a given file access service to the operating system with respect to a given virtual file by:

(i) obtaining from the data repository system a location in the native file system of a prototype of a native file corresponding to the given virtual file, (ii) using the obtained location of the prototype to request that the first file system driver provide to the second file system driver the given file access service with respect to the prototype, wherein the first file system driver provides a response to the given file access service request of the second file system driver, (h) completing the given file access service to the operating system by passing the response of the first file system driver to the operating system.

5. The data processing system of claim 4 wherein the operating system comprises the first file system driver, the mass storage device driver and the second file system driver.

6. The data processing system of claim 4 wherein the virtual files include virtual folders.

7. The data processing system of claim 6 wherein the prototype for a given virtual folder is a native folder.

8. The data processing system of claim 4 wherein the data repository system is at least partially stored on the mass storage device.

9. The data processing system of claim 4 wherein, if there is no prototype for the given virtual file, then the second file system driver creating the prototype in the native file system from information about the prototype in the data repository system.

10. A method of working with native files through a virtual file system in a data processing system configured to run an operating system, the operating system being configured to implement a native file system through a native file system driver, the native file system driver comprising function routines and file management structures for accessing native files stored in the native file system, the native file system including names, attributes and locations of the native files of the native files, the method comprising the steps of:

(a) programming the operating system to access a virtual file system device driver, the virtual file system driver comprising function routines and file management structures for emulating file access services with respect to virtual files;

(b) storing a description of a virtual file system in a data repository system, the description of the virtual file system including names, attributes and locations of virtual files within the virtual file system, the virtual file system further including for at least one virtual file a location in the native file system of a prototype for the virtual file, the prototype comprising a native file;

(c) providing a given file access service to the operating system with respect to a given virtual file by:

(i) accessing the data repository system and obtaining a location in the native file system of the prototype corresponding to the given virtual file, the prototype comprising a one of the native files;

(ii) using the obtained location of the prototype to request that the native file system device driver provide to the virtual file system device driver the given file access service with respect to the prototype, wherein the native file system- device driver provides a response to the given file access service request of the virtual file system device driver;

(d) completing the given file access service to the operating system by passing the response of the native file system device driver to the operating system.

11. The method of working with native files through a virtual file system in a data processing system of claim 10, the data processing system further comprising a control application, wherein a user uses the control application to map native files from the native file system to virtual files in the virtual file system, the control application interfacing the virtual file system driver to the data repository system.

12. The method of working with native files through a virtual file system in a data processing system of claim 10, wherein the data repository system is at least partially stored on the mass storage device.

13. The method of working with native files through a virtual file system in a data processing system of claim 10, wherein if there is no prototype for the given virtual file, then the virtual device driver creating the prototype in the native file system from information about the prototype in the data repository system.

14. The method of working with native files through a virtual file system in a data processing system of claim 10, wherein the programming step comprises the steps of:

(a) registering the virtual file system driver with the operating system; and (b) mounting a virtual disk associated with the virtual file system.

15. The method of working with native files through a virtual file system in a data processing system of claim 10, wherein the native file system has a first logical disk name associated therewith and the virtual file system has a second logical disk name associated therewith.

16. A computer program recorded on a computer readable medium for allowing users to work with native files through a virtual file system in a data processing system configured to run an operating system, the operating system being configured to implement a native file system through a native file system driver, the native file system driver comprising function routines and file management structures for accessing native files stored in the native file system, the native file system including names, attributes and locations of the native files of the native files, the computer program comprising:

(a) function routines and file management structures for emulating file access services with respect to virtual files;

(b) instructions for storing a virtual file system in a data repository system, including names, attributes and locations of virtual files within the virtual file system, (c) instructions for including for at least one virtual file a location in the native file system of a prototype for the virtual file, the prototype comprising a native file;

(d) instructions for servicing file access requests with respect to a given virtual file comprising subroutines respectively correlative to the file access services provided by the native file system, wherein at least one of the subroutines includes:

(A) instructions for accessing the data repository system and obtaining a location in the native file system of the prototype corresponding to the given virtual file, the prototype comprise a one of the native files;

(e) using the obtained location of the prototype to request that the native file system device driver provide the given file access service with respect to the prototype.

17. A method of organizing files in an data processing system, the data processing system comprising an operating system, a native file system comprising native folders and native files, a first mass storage device having a native disk in which the native file system is stored, and a native file system driver for interfacing the operating system to the native file system, the method comprising:

(a) installing a virtual file system driver;

(b) the virtual file system driver creating virtual disks having respective virtual file systems comprising virtual folders and virtual files, the virtual file systems including for each virtual folder a reference to a one of the native folders, and for each virtual file a reference to a one of the native files; and (c) receiving requests to open specified virtual files, and invoking the native file system driver to open the native files referenced by virtual file system for the specified virtual files.

* * * * *